United States Patent
Park et al.

(10) Patent No.: US 10,375,002 B2
(45) Date of Patent: *Aug. 6, 2019

(54) PRESENTING MESSAGES ASSOCIATED WITH LOCATIONS

(71) Applicant: Microsoft Technology Licensing, LLC, Redmond, WA (US)

(72) Inventors: Seung-Hae Park, Seattle, WA (US); Hisun Kim, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/203,344

(22) Filed: Jul. 6, 2016

(65) Prior Publication Data
US 2016/0315896 A1    Oct. 27, 2016

Related U.S. Application Data

(63) Continuation of application No. 14/306,099, filed on Jun. 16, 2014, now Pat. No. 9,413,704, which is a
(Continued)

(51) Int. Cl.
*G06F 21/00*     (2013.01)
*H04L 12/58*     (2006.01)
(Continued)

(52) U.S. Cl.
CPC .............. *H04L 51/20* (2013.01); *G06F 21/31* (2013.01); *G06F 21/60* (2013.01);
(Continued)

(58) Field of Classification Search
CPC .. G06F 21/60; G06F 21/6245; G06F 21/6272; G06F 21/31
See application file for complete search history.

(56) References Cited

U.S. PATENT DOCUMENTS 7,630,724 B2    12/2009   Beyer et al.
7,801,542 B1     9/2010   Stewart
(Continued)

FOREIGN PATENT DOCUMENTS

JP    2002271839 A    9/2002
JP    2003153320 A    5/2003
(Continued)

OTHER PUBLICATIONS

"Third Office Action Issued in Chinese Patent Application No. 201280022275.4", dated Dec. 21, 2016, 17 Pages.
(Continued)

*Primary Examiner* — Edward Zee

(57) ABSTRACT

A user may express an interest in a set of individuals represented in a set of individual stores (e.g., friends in a social network and colleagues in an academic directory). Such individuals may send to the individual stores messages that are associated with a location, and the user may request, from respective individual stores, a presentation of the locations. According to the techniques presented herein, the messages from the individual stores may be aggregated, and the locations associated with the aggregated messages may be presented in a map, thereby presenting to the user the locations of the messages of the individuals irrespective of from which individual store each message was received. Additionally, the map may present the messages to the user, and upon receiving form the user a reply to a message, may send the message to the individual store from which the message was received.

20 Claims, 7 Drawing Sheets

Related U.S. Application Data continuation of application No. 13/104,351, filed on May 10, 2011, now Pat. No. 8,763,153.

(51) Int. Cl.
    *G06F 21/60*     (2013.01)
    *G06F 21/62*     (2013.01)
    *G06F 21/31*     (2013.01)
    *H04W 4/02*     (2018.01)
    *H04W 4/12*     (2009.01)
    *H04L 29/06*     (2006.01)

(52) U.S. Cl.
    CPC ...... *G06F 21/6245* (2013.01); *G06F 21/6272* (2013.01); *H04L 51/32* (2013.01); *H04L 63/08* (2013.01); *H04W 4/023* (2013.01); *H04W 4/12* (2013.01)

(56) References Cited

U.S. PATENT DOCUMENTS

| | | | |
|---|---|---|---|
| 7,848,765 B2 | 12/2010 | Phillips et al. | |
| 2006/0270421 A1* | 11/2006 | Phillips | G08B 21/0236 |
| | | | 455/457 |
| 2007/0200713 A1* | 8/2007 | Weber | H04L 67/24 |
| | | | 340/573.1 |
| 2007/0255807 A1 | 11/2007 | Hayashi et al. | |
| 2007/0281689 A1* | 12/2007 | Altman | G06Q 30/0207 |
| | | | 455/435.1 |
| 2008/0028063 A1 | 1/2008 | Holmes et al. | |
| 2008/0119200 A1 | 5/2008 | McConnell | |
| 2008/0140650 A1* | 6/2008 | Stackpole | G06F 17/3087 |
| 2008/0171555 A1 | 7/2008 | Oh et al. | |
| 2008/0220728 A1 | 9/2008 | Seo | |
| 2009/0209286 A1 | 8/2009 | Bentley et al. | |
| 2009/0258656 A1* | 10/2009 | Wang | H04W 4/02 |
| | | | 455/456.1 |
| 2009/0325603 A1 | 12/2009 | Van Os et al. | |
| 2010/0106801 A1 | 4/2010 | Bliss et al. | |
| 2010/0130173 A1 | 5/2010 | Gupta | |
| 2010/0325194 A1* | 12/2010 | Williamson | H04W 4/02 |
| | | | 709/203 |
| 2011/0004561 A1 | 1/2011 | Shahine et al. | |
| 2011/0320981 A1 | 12/2011 | Shen et al. | |
| 2012/0047129 A1* | 2/2012 | Redstone | G06F 17/3087 |
| | | | 707/723 |
| 2012/0136565 A1* | 5/2012 | Kennedy | G01C 21/367 |
| | | | 701/409 |

FOREIGN PATENT DOCUMENTS

| | | | |
|---|---|---|---|
| JP | 2005208795 A | 8/2005 | |
| JP | 2007166189 A | 6/2007 | |
| JP | 2009015807 A | 1/2009 | |
| JP | 2010015013 A | 1/2010 | |

OTHER PUBLICATIONS

"Inside Facebook: A Facebook location API Could be Coming Soon", Retrieved From <<http://web.archive.org/web/20110108205633/http://xtremelysocial.com/2010/inside-facebook-a-facebook-location-api-could-be-coming-soon/<<, Retrieved Date: Jan. 12, 2011, 3 Pages.

"Communication Pursuant to Rules 70(2) and 70a(2) Issued in European Patent Application No. 12782006.6"dated Apr. 2, 2015, 1 Page.
"Supplementary Search Report Issued in European Patent Application No. 12782006.6", dated Mar. 16, 2015, 7 Pages.
"Final Office Action Issued in U.S. Appl. No. 13/104,351", dated Aug. 22, 2013, 20 Pages.
"Non-Final Office Action Issued in U.S. Appl. No. 13/104,351", dated Jan. 22, 2013, 17 Pages.
"Notice of Allowance Issued in U.S. Appl. No. 13/104,351", dated Feb. 6, 2014, 9 Pages.
"Preliminary Amendment Filed in U.S. Appl. No. 13/104,351", Filed Date: Jun. 13, 2012, 3 Pages.
"Response to Non-Final Office Action Issued in U.S. Appl. No. 13/104,351", Filed Date: Jan. 22, 2014, 20 Pages.
"Response to Non-Final Office Action Issued in U.S. Appl. No. 13/104,351", Filed Date: May 22, 2013, 17 Pages.
"Final Office Action Issued in U.S. Appl. No. 14/306,099", dated Aug. 5, 2015, 18 Pages.
"Non-Final Office Action Issued in U.S. Appl. No. 14/306,099", dated Jan. 16, 2015, 19 Pages.
"Notice of Allowance Issued in U.S. Appl. No. 14/306,099", dated Mar. 31, 2016, 5 Pages.
"Supplemental Notice of Allowability Issued in U.S. Appl. No. 14/306,099", dated Apr. 13, 2016, 2 Pages.
"Supplemental Notice of Allowability Issued in U.S. Appl. No. 14/306,099", dated Apr. 28, 2016, 2 Pages.
"First Office Action Issued in Chinese Patent Application No. 201280022275.4", dated Mar. 24, 2016, 13 Pages.
"Office Action Issued in Japanese Patent Application No. 2014-510359", dated Mar. 29, 2016, 7 Pages.
Glazier, Alan, "SM & Your Eyecare Business: Social Media Aggregation and "Lifestreaming"—Lesson 9", Retrieved From <<http://www.sightnation.com/blog/sm-your-eyecare-business-social-media-aggregation-and-lifestreaming-lesson-9\>>, May 18, 2010, 3 Pages.
Gupta, et al., "Characterization of FriendFeed—A Web-based Social Aggregation Service", In International AAAI Conference on Weblogs and Social Media, May 17, 2009, 4 Pages.
Ingram, Mathew, "Facebook Places Will Be About More Than Just a Check-In", Retrieved From <<http://gigaom.com/2010/08/10/facebook-places-will-be-about-more-than-just-a-check-in/>>, Aug. 10, 2010, 10 Pages.
Myllymaki, et al., "Location Aggregation from Multiple Sources", In Proceedings of the Third International Conference on Mobile Data Management, Jan. 8, 2002, 8 Pages.
"International Preliminary Report on Patentability Issued in PCT Application No. PCT/US2012/036034", dated Nov. 21, 2013, 6 Pages.
"International Search Report & Written Opinion for PCT Application No. PCT/US2012/036034", dated Nov. 14, 2012, 9 Pages.
"Notice of Allowance Issued in Japanese Patent Application No. 2016-248026", dated Jan. 9, 2018, 6 Pages.
"Office Action Issued in European Patent Application No. 12782006.6", dated Nov. 14, 2017, 5 Pages.
"Office Action Issued in Korean Patent Application No. 10-2013-7029749", dated Dec. 13, 2017, 5 Pages.
"Office Action Issued in European Patent Application No. 12782006.6", dated Feb. 15, 2019, 5 Pages.
"Office Action Issued in Chinese Patent Application No. 201610674913.0", dated Mar. 5, 2019, 14 Pages.

* cited by examiner

PRESENTING MESSAGES ASSOCIATED WITH LOCATIONS

CROSS-REFERENCE TO RELATED APPLICATIONS

The present application is a continuation of U.S. patent application Ser. No. 14/306,099, filed Jun. 16, 2014, entitled "PRESENTING MESSAGES ASSOCIATED WITH LOCATIONS," which is a continuation of U.S. patent application Ser. No. 13/104,351, filed May 10, 2011, entitled "PRESENTING MESSAGES ASSOCIATED WITH LOCATIONS," each of which is hereby incorporated by reference in their entirety.

BACKGROUND

Within the field of computing, many scenarios involve a user who is associated with a set of individuals represented in an individual store, such as acquaintances with whom the user has established a relationship in a social, academic, or professional network and individuals associated with an organization including the user and represented within an organization contact store. In such scenarios, respective individuals may author and send the user (specifically or as part of a group including the user) one or more messages. Moreover, such messages may be associated with a location, such as a location of the individual upon sending the message, a location that the individual has visited in the past or intends to visit in the future, or a location associated with the content of the message authored by the individual.

The user may present to a device a request to view the messages presented by such individuals within an individual store. For example, in a social network, the user may request to view the messages generated by the individuals of the social network with whom the individual has a relationship. The device may therefore contact an individual store, receive the messages sent by such individuals, and present the messages to the user. Moreover, the device may indicate to the user the location of the message (e.g., presenting a text identifier, picture, or map of the location).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A user may have relationships with or interest in individuals represented in several individual stores. For example, the user may be part of one or more organizations respectively featuring an organization directory including the individuals of the organization; a professional networking service comprising a set of individuals having professional relationships with the user; an academic networking service comprising a set of individuals having academic relationships with the user; and a social networking service comprising a set of individuals having social relationships with the user. Individuals represented within these various individual stores may write messages to the user that are associated with a location (e.g., a location where the individual is located while writing the message; a location mentioned by the individual in the message; or a location that the individual has visited in the past or intends to visit in the future). However, in order to view all of these messages, the user may have to visit each individual store and request the messages from the individuals represented in the individual store.

Presented herein are techniques for improving the experience of a user while viewing a set of messages posted by individuals on two or more individual stores. In accordance with these techniques, a device operated by the user may request and receive the messages from all of the individual stores, and may aggregate the messages for presentation to the user. The device may then identify a location associated with each message, and present the messages to the user in the form of a map indicating the locations associated with the messages. Moreover, the map may be restricted to messages associated with a location within a vicinity of the user location of the user, and/or to messages posted within a range of a particular date. Many variations in the generation of the map and presentation to the user may be devised by those having ordinary skill in the art while implementing the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
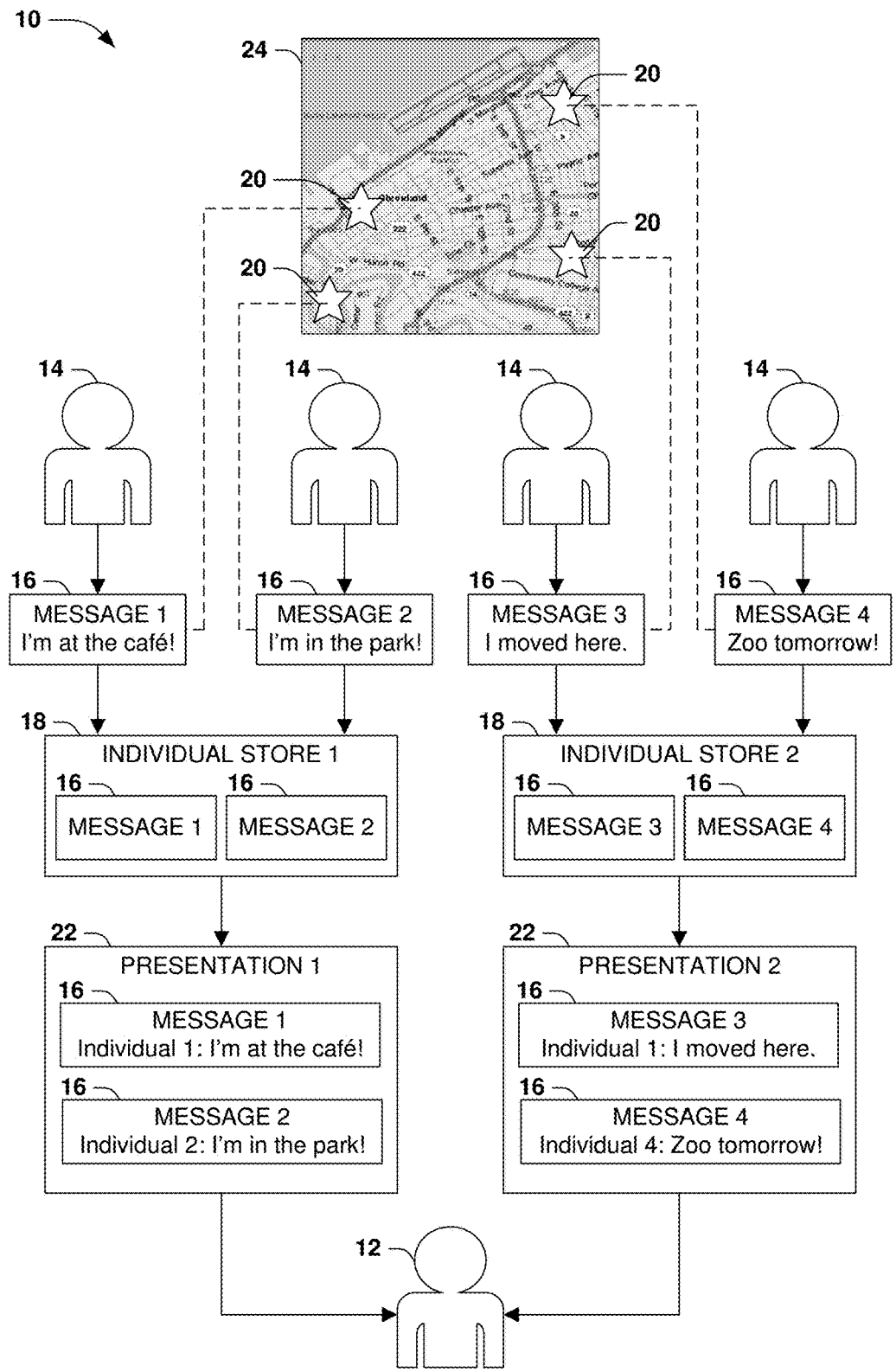
FIG. 1 presents an illustration of an exemplary scenario featuring a presentation to a user comprising messages associated with locations and written by individuals and submitted to two or more individual stores.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve a user who wishes to receive a set of messages from a specific set of individuals who are represented in an individual store. As a first example, the individual store may comprise a social network; the individuals may comprise family members, friends, and acquaintances with whom the individual has established a social relationship; and the messages may comprise public or semi-public status messages. As a second example, the individual store may comprise a professional or academic directory; the individuals may comprise professional or academic colleagues with whom the individual has interacted in a business or school; and the messages may comprise private messages send to the user through the network messaging system. As a third example, the individual store may comprise a public or semi-public status service; the individuals may comprise public figures (e.g., celebrities or cultural leaders) in whom the user has expressed an interest, e.g., by requesting to "follow" the status messages submitted by the individuals; and the messages may comprise the status updates presented by such individuals for consumption by the "followers" of the individual. Additionally, the user may wish to view messages submitted by individuals to a plurality of individual stores (e.g., a social network, a professional network, and a company directory).

In these and other scenarios, individuals may write messages (either impersonal or specifically addressed to the individual) that the individual store may deliver to the user. In particular, many of these messages may reference a location, such as the location of the individual at the time of writing the message; a location that is referenced within the content of the message; or a location that the individual has visited in the past, or intends to visit in the future. Accordingly, the location associated with a message may be presented to the user within the body of the message (e.g., "I visited the park today"); may be presented to the user with the message (e.g., "the following message was sent by the individual from the park"); or may be extracted from the message and presented apart from the message (e.g., "this individual has sent messages from or referenced the following locations: . . . "). An individual store may also facilitate the presentation of the location to the user; for example, if the individual store may identify a location associated with a message in an unambiguous manner (e.g., a set of global positioning system (GPS) coordinates), the individual store may supplement the presentation of the message with additional information about the location, such as a map or aerial photograph of the location.

FIG. 1 presents an illustration of an exemplary scenario 10 featuring a user 12 who has expressed an interest in a set of individuals 14. These individuals 14 may be represented in one or more individual stores 18; e.g., a first pair of individuals 14 may be represented in a first individual store 18 (such as friends having profiles in a social network), and a second pair of individuals 14 may be represented in a second individual store 18 (such as professional or academic colleagues of the user 12 represented in a professional or academic directory). The individuals 14 may submit messages 16 to the individual stores 18 that may be delivered to the user 12 (e.g., public messages such as weblog posts; semi-public messages such as status updates that the author has written for delivery to a set of users 12; or private messages directed to the user 12). The individual stores 18 may be configured to receive the messages 16 from the individuals 14, may store the messages 16, and, upon request from the user 12, may generate a presentation 22 of the messages 16 for the user 12. For example, the user 12 may visit a website associated with the first individual store 18, may request messages 16 from the individuals 14 represented in the first individual store 18, and may view a presentation 22 of the messages 16 presented by the first individual store 18. Moreover, one or more messages 16 may reference a location 20 in an area 24. For example, the first message 16 was written by an individual 14 at a location 20 within the area 24; the third message 16 includes content that specifically references a location 20 within the area 24; and the fourth message 16 indicates a location 20 within the area 24 that the individual 14 intends to visit in the future. Accordingly, the respective individuals stores 18 may, in separate presentations 22, present to the user 12 the messages 16 associated with various locations 20.

However, the exemplary scenario 10 of FIG. 1 presents some disadvantages. For example, the presentations 22 are isolated to the messages 16 stored by a particular individual store 18, and in order to view the messages 16 of all individuals 14, the user 12 may have to request, receive, and review separate presentations 22 generated by the separate individual stores 18. There is no synergy or aggregation of the messages 16, even if messages 16 presented in different individual stores 18 reference the same location 20, or if the same individual 14 presents the same message 16 referencing the same location 20 within separate individual stores 18. Additionally, the individual stores 18 simply present the messages 16 associated with locations 20, but do not facilitate the user 12 by providing any further information about the locations 20, such as a map of the locations.

In view of these disadvantages, presented herein are exemplary techniques for presenting messages 16 associated with locations 20 that are written by individuals 14 and stored in two or more individual stores 18. In accordance with these techniques, instead of being presented in separate presentations 22 based on the individual store 20 wherein each message is stored 16, the messages 16 presented by such individuals 14 may be aggregated into a joint presentation 22. For example, an embodiment of these techniques may be configured to contact several individual stores 20 to receive all of the messages 16 stored therein, aggregate all of the messages 16, and generate the aggregated presentation 22 of the messages 16 for the user 12. Moreover, the locations 20 associated with such messages 16 may be received and evaluated, and the aggregated presentation 22 may present all of the referenced locations 20 as a map. The aggregated presentation 22 may therefore enable the user 12 to view the entire set of locations 20 referenced in messages 16 by individuals 14 (e.g., a map of an area 24 illustrating the locations 20 that the individuals 14 have referenced, such as where such individuals 14 are located when authoring the messages 16 or where such individuals 14 intend or suggest to visit).

Figure 2:
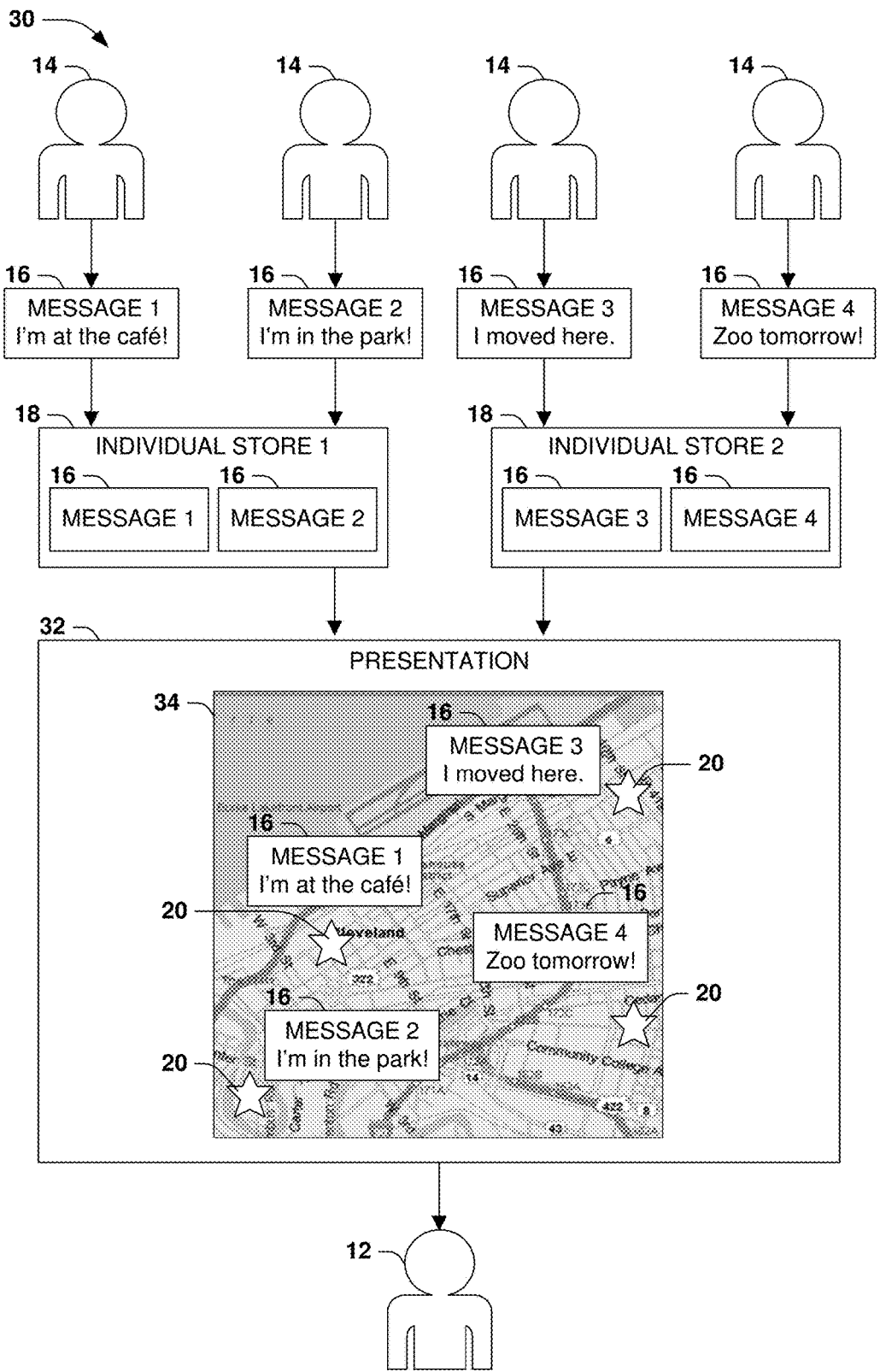
FIG. 2 presents an illustration of an exemplary scenario featuring a presentation to a user comprising messages associated with locations written by individuals and submitted to two or more individual stores in accordance with the techniques presented herein.

FIG. 2 presents an illustration of an exemplary scenario 30 featuring a presentation to a user 12 of locations 20 associated with messages 16 written by individuals 14 in whom the user 12 has expressed an interest. In this exemplary scenario 30, the individuals 14 are represented in two individual stores 18, and the individuals 14 write messages 16 and send such messages 16 to the individual stores 18. The user 12 may request to view such messages 16 in a presentation 32. However, in contrast with the exemplary scenario 10 of FIG. 1, this exemplary scenario 30 illustrates the presentation 32 according to the techniques presented herein. For example, an embodiment of these techniques may receive the messages 16 sent to the individual stores 18, and when the user 12 requests to view the messages 16, the embodiment may generate a presentation 32 including a map 34 that indicates the locations 20 associated with the messages 16 submitted by such individuals 14 to both individual stores 18. The messages 16 may also be presented on the map 34 (e.g., presenting an indicator of a location 20 on the map 34 associated with a message 16, and also presenting the content of the message 16 on the map 34 near the indicator). Alternatively, the messages 16 may not initially be presented, but may be revealed to the user 12 upon selecting an indicator of a location 20 (e.g., the embodiment may present the set of messages 16 associated with the selected location 20). In this manner, the user 12 may receive an overview of the locations 20 associated with the messages 16 from the individuals 14, irrespective of which individual store 18 the individuals 14 sent the messages 16.

Figure 3:
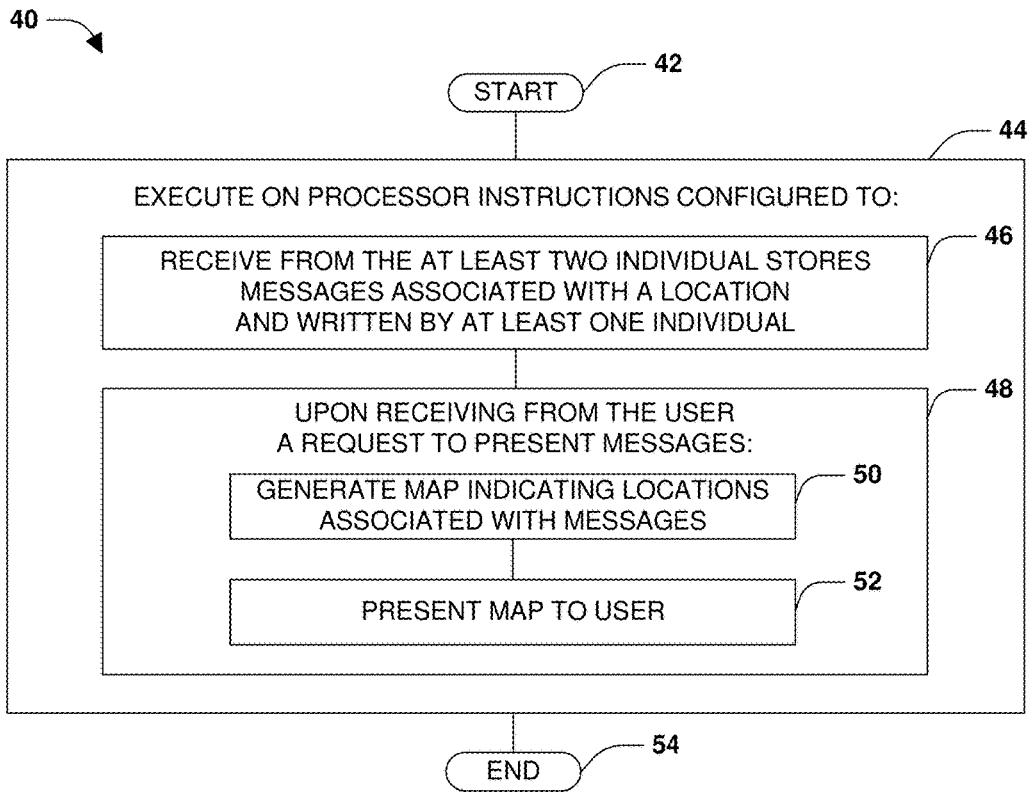
FIG. 3 is a flow chart illustrating a first exemplary method of presenting to a user messages written by individuals and associated with locations.

FIG. 3 presents an illustration of a first embodiment of these techniques, presented as an exemplary method 40 of presenting, on a device having a processor and operated by a user 12, messages associated with locations 20 and written by individuals 16 represented in at least two individual stores 18. The exemplary method 40 may be implemented, e.g., as a set of instructions stored in a memory component of the device (e.g., a memory circuit, a platter of a hard disk drive, a solid-state storage device, or an optical or magnetic disc) that, when executed on the processor of the device, cause the device to perform the techniques presented herein. The exemplary method 40 begins at 42 and involves executing 44 the instructions on the processor. In particular, the instructions are configured to receive 46 from the at least two individual stores 18 messages 16 associated with a location 20 and written by at least one individual 14. The instructions are also configured to, upon receiving 48 from the user 12 a request to present the messages 16, generate 50 a map 34 indicating the locations 20 associated with the messages 16, and present 52 the map 34 to the user 12. In this manner, the exemplary method 40 achieves the presentation of a map 34 aggregating the locations 20 associated with messages 16 to the user 12 received from a plurality of individual stores 18, and so ends at 54.

Figure 4:
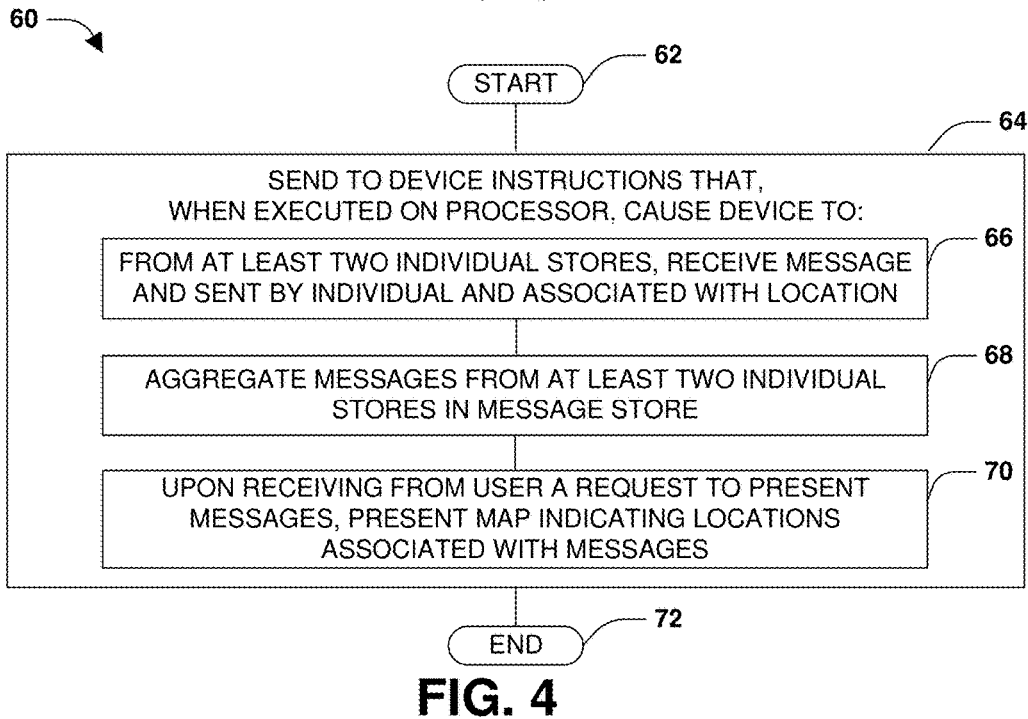
FIG. 4 is a flow chart illustrating a second exemplary method of presenting to a user messages written by individuals and associated with locations.

FIG. 4 presents a second embodiment of these techniques, illustrated as an exemplary method 60 of presenting, on a device having a processor and a message store and operated by a user 12, messages 16 associated with locations 20, where such messages 16 have been written by individuals 14 represented in at least two individual stores 18. The exemplary method 60 begins at 62 and involves sending 64 instructions to the device that, when executed on the processor of the device, cause the device to perform the techniques presented herein. In particular, the instructions are configured to, from the at least two individual stores 18, receive 66 at least one message 16 sent by an individual 14 and associated with a location 20. The instructions are also configured to aggregate 68 the messages 16 from the at least two individual stores 18 in the message store of the device. The instructions are also configured to, upon receiving from the user 12 a request to present the messages 16, present 70 to the user 12 a map 34 indicating the locations 20 associated with the messages 16. In this manner, the exemplary method 60 achieves the configuration of the device to present to the user 14 a map 34 aggregating the locations 20 references in the messages 16 of the individuals 14, irrespective of the individual stores 18 to which the individuals 14 sent the respective messages 16.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
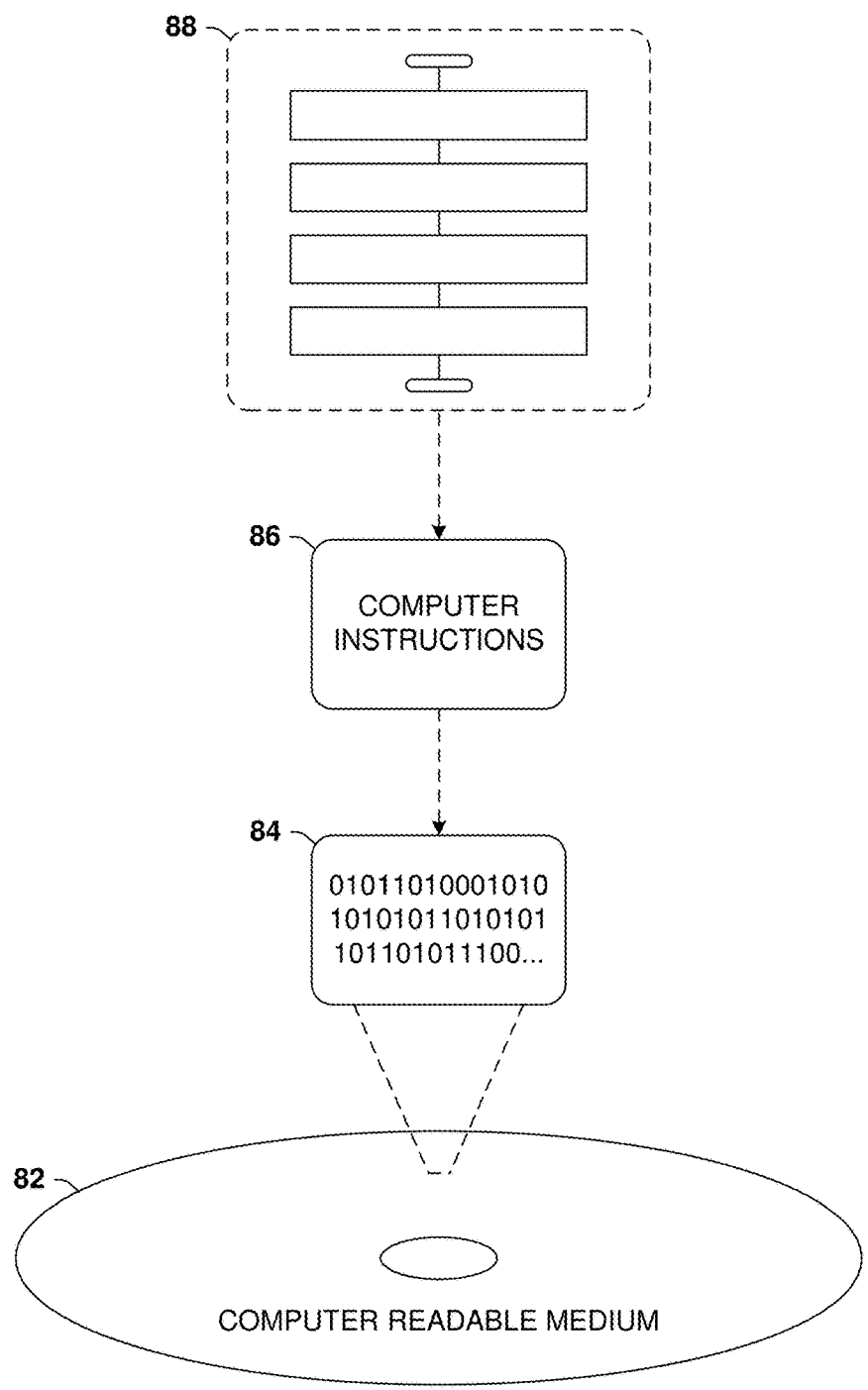
FIG. 5 is an illustration of an exemplary computer-readable medium comprising processor-executable instructions configured to embody one or more of the provisions set forth herein.

An exemplary computer-readable medium that may be devised in these ways is illustrated in FIG. 5, wherein the implementation 80 comprises a computer-readable medium 82 (e.g., a CD-R, DVD-R, or a platter of a hard disk drive), on which is encoded computer-readable data 84. This computer-readable data 84 in turn comprises a set of computer instructions 86 configured to operate according to the principles set forth herein. In one such embodiment, the processor-executable instructions 86 may be configured to perform a method of presenting to a user messages written by individuals and associated with locations, such as the exemplary method 40 of FIG. 3, or the exemplary method 60 of FIG. 4. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 40 of FIG. 3 and the exemplary method 60 of FIG. 4) to confer individual and/or synergistic advantages upon such embodiments.

A first aspect that may vary among embodiments of these techniques related to the scenarios wherein such techniques may be utilized. As a first example, many types of individuals 14 may write and send messages 16 to many types of individual stores 18, such as family members, friends or acquaintances having a profile in a social network; colleagues who are listed in a professional or academic directory; and public figures, such as celebrities or cultural leaders, who post public messages 16 to weblogs. As a second example of this first aspect, these techniques may be utilized to present many types of messages 16, including text messages, audio messages such as voice messages, and picture or video messages (including pictures or video of a particular location 20), and various types of data files including a message written by an individual 14 (e.g., an extensible markup language (XML) file including a list of locations 20 that the individual 14 has visited or intends to visit). As a third example of this first aspect, locations 20 may be associated with messages 16 in many ways, such as a location 20 where a message 16 was written by the individual 14; a location 20 referenced in the content of the message 16; or a location 20 associated with the message 16 (e.g., a report of a location 20 visited by the individual 14 in the past, or a location 20 that the individual 14 intends to visit in the future). Additionally, the location 20 may be associated with the message 14 in various ways (e.g., an explicit reference to a location 20 by name, address, or latitude/longitude coordinates, or an implicit reference to a location 20, such as a comment that the individual 14 is at home, where a home address of the individual 14 may be retrieved). As a fourth example, many types of maps 34 may be presented to the user 12, including road maps, topographical maps, stylized maps featuring stylized depictions of the locations 20, pictorial maps featuring photographic images of the locations 20. Such maps 34 may be two- or three-dimensional, and may be static, moving, and/or interactive. As a fifth example, the map 34 may be presented on many types of devices operated by the user 12, such as a desktop or portable computer, a television, or a handheld device such as a smartphone or global positioning system (GPS) receiver. Those of ordinary skill in the art may devise many such scenarios wherein the techniques presented herein may be utilized.

A second aspect that may vary among embodiments of these techniques relates to the manner of receiving messages 16 from the respective individual stores 18. As a first example, an embodiment of these techniques may contact each individual store 18 to request and retrieve the messages 16 stored therein that are accessible to the user 12. This request may involve, e.g., sending a web request to a website, receiving a web page including a presentation 22 of the messages 16, and utilizing various techniques (e.g., "web scraping") to extract the messages 16 and locations 20 associated therewith. Alternatively, one or more individual stores 18 may present an individual store interface, such as a web service, a database interface, or an application programming interface (API), through which the messages 16 may be received in an automated manner, and an embodiment may invoke the individual store interface to request the messages 18. Alternatively, one or more individual stores 18 may be configured to send messages 18 to a user 12 automatically upon receiving the message 18 from an individual 14 (e.g., a "push" architecture). For example, a device operated by the user 12 may contact the individual store 18 to provide an address (e.g., an internet protocol (IP) address or an email address) where the individual store 18 is to send messages 16, and may monitor the address to receive messages 16 spontaneously sent by the individual store 18.

As a second example of this second aspect, an individual store 18 may be configured to present messages 16 publicly to any user 12, even unknown and/or anonymous users 12. Alternatively, an individual store 18 may only provide messages 16 to particular users 12, and, before sending messages 16 to any user 12, may endeavor to authenticate the user 12 according to at least one credential (e.g., a login username and password, a security certificate, a cryptographic signature, or a detected biometric). Accordingly, an embodiment of these techniques may be configured to, upon receiving a credential authenticating the user 12, store the credential; and to, while requesting a message 16 from an individual store 18, authenticate the user 12 with the individual store 18 according to at least one credential.

As a third example of this second aspect, the user 12 may have a particular user location, such as a location where the user 12 is currently located. The user location of the user 12 may be specified by the user 12, or may be automatically detected and/or inferred (e.g., by invoking a global positioning system (GPS) receiver interfacing with a device implementing an embodiment of these techniques, or by triangulating with nearly location sources, such as wireless networks or cellular towers having a known location). In such scenarios, the embodiment of these techniques may be configured to request messages 16 associated with locations 20 within a range of the user location (e.g., locations 20 in the vicinity of the user 12). If the user 12 is only interested in messages 16 relating to nearly locations 20, this embodiment may conserve the computing resources and improve the performance of the device and/or the information stores 18 by only requesting, receiving, and presenting the messages 16 within the vicinity of the user location that are of interest to the user 12. Moreover, the device may be generally configured to request messages 16 from the individual store 18 at a message query frequency, but may request messages 16 from an individual store 18 that are associated with a location 18 at a location message query frequency that is higher than the message query frequency (e.g., pinging or querying the individual store 18 once every five minutes for updates to the messages 16, but also pinging or querying the individual store 18 once every thirty seconds for updates to messages 16 associated with locations 20). This variation may be advantageous, e.g., for presenting messages 16 associated with locations 20 with lower latency, since such messages 16 may be more time-sensitive and/or ephemeral (e.g., messages 16 indicating a current location of an individual 14) than other messages 16.

As a fourth example of this second aspect, an embodiment of these techniques may request messages 16 from one or more individual stores 18 upon receiving the request from the user 12 to present the messages 16 (e.g., an "ad hoc" retrieval of messages 16). Alternatively, an embodiment may frequently and/or continuously retrieve and store the messages 16 (e.g., through either a "push" mechanism or a "pull" mechanism) at a first time point, even in the absence of such a request. A later time (a second time point after the first time point), the embodiment may receive such a request from the user 12, and may generate the map 34 using the previously received and stored messages 16. This variation may be advantageous, e.g., for presenting the messages 16 more rapidly than the alternative embodiment, which has to contact the individual stores 18 and request and receive the messages 16. Moreover, frequently or continuously storing messages 16 may enable other features. For example, the request may, upon receiving a message 16, store a time point with the message 16 (e.g., the time when the message 16 was written by an individual 18 and/or received from the individual store 18). The request received from the user 12 may specify a selected time point, and an embodiment may retrieve from the message store and generate a map 34 from only the messages 16 having a time point within a range of the selected time point (e.g., within one hour of the selected time point). This variation may enable the user 12 to view a past or historical set of locations 20 visited by the individuals 14 (e.g., "show a map 34 of locations 20 that my contacts within a social network visited yesterday").

Figure 6:
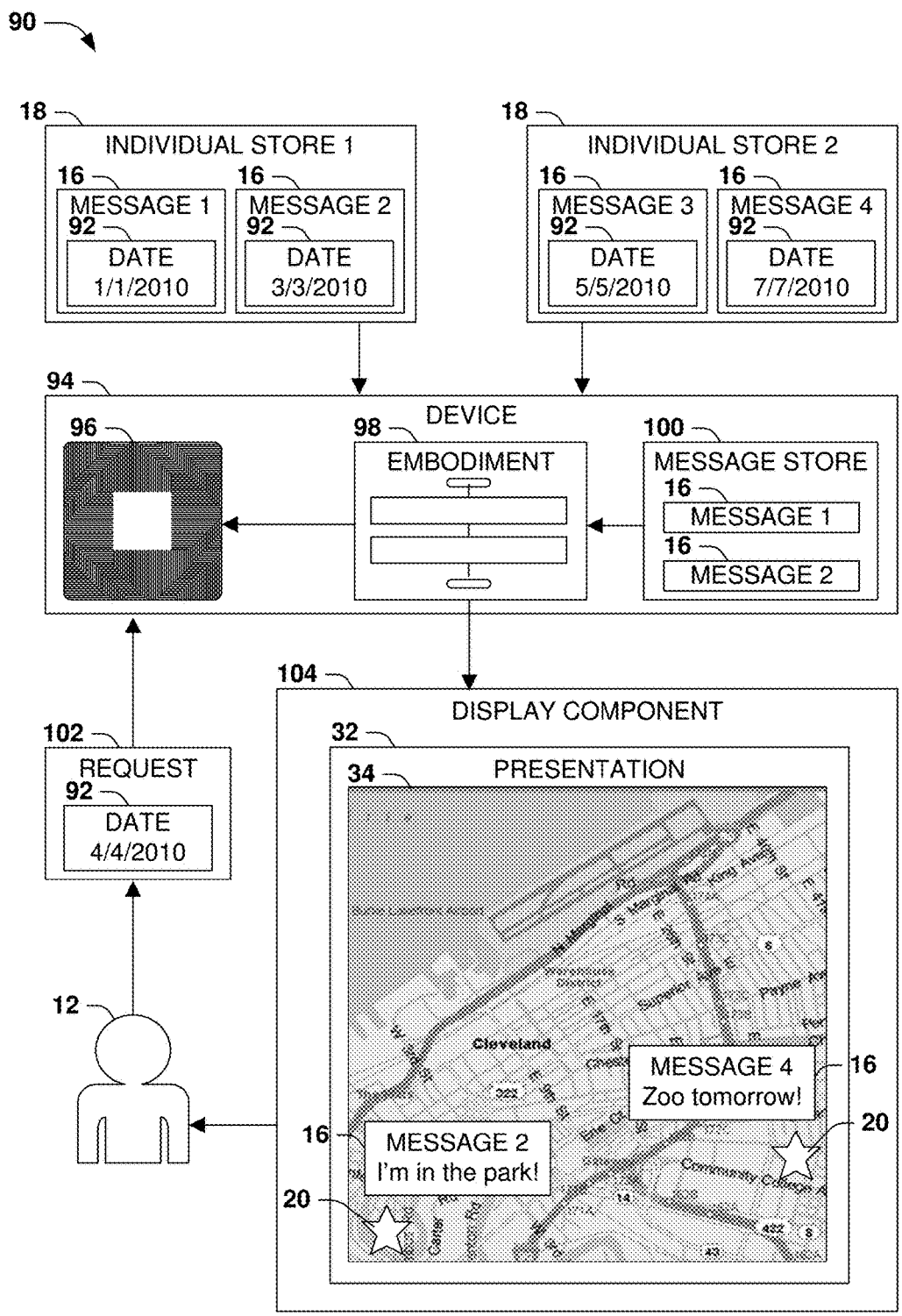
FIG. 6 is an illustration of an exemplary scenario featuring a historical presentation of messages within a range of a selected time point.

FIG. 6 presents an illustration of an exemplary scenario 90 featuring a historical presentation of messages 16 within a range of a selected time point. In this exemplary scenario 90, a device 94 comprising a processor 96 and a message store 100 is configured to receive and store messages 16 received from two individual stores 18, and a display component 104 whereupon maps 34 may be displayed for the user 12. This device 94 also includes an embodiment 98 of these techniques (e.g., a memory component storing instructions configured as illustrated in the exemplary scenario 40 of FIG. 3). As further illustrated in this exemplary scenario 90, the messages 16 stored by the individual stores 18 are associated with a date 92, which is stored with the message 16 in the message store 100, and a request 102 submitted by the user 12 to receive messages 16 specifies a selected date 92, such as the current date and time, a date and time in the past, or a date and time in the future. Accordingly, the embodiment 98 may select from the message store 100 the messages 16 having a date 92 within a range of the selected date 92, and may generate a map 34 illustrating the locations 20 associated with such messages 16. In this manner, the embodiment 98 achieves a date filtering of the messages 16 and the generation of a map 34 illustrating only the locations 20 associated with such messages 16. Those of ordinary skill in the art may devise many ways of requesting and receiving messages 16 in accordance with the techniques presented herein.

A third aspect that may vary among embodiments of these techniques relates to the generation of the map 34 presenting to the user 12 the locations 20 associated with the messages 16. As a first example, if a user location of the user 12 may be identified (e.g., provided by a global positioning system (GPS) receiver communicating with a device 94 including an embodiment 98 of these techniques), the map 34 may be localized to the user location of the user 12, such as restricting the map 34 to a particular range within the vicinity of the user location.

As a second example of this third aspect, the map 34 may indicate, among the locations 20 depicted on the map 34, one or more popular locations that are frequently associated with messages 20 written by the individuals 14. For example, an embodiment may identify, for respective locations 20, a message count of messages 16 that are associated with the location 20, and may identify on the map 34 the locations 20 having a high message count (e.g., by highlighting the indicators of such locations 20 or using a distinctive indicator therefor).

As a third example of this third aspect, the map 34 may use different visual indicators to indicate different properties of the locations 20 depicted on the map 34. As one such example, respective individual stores 18 may be associated with a visual identifier distinguishing the individual store 18 from other individual stores 18, and the map 34 may depict the locations 20 with the distinctive visual identifier of the individual store 18 from which the message 16 associated with the location 20 was received. Similarly distinguishing visual identifiers may be used to identify, e.g., which individual 14 posted messages 16 associated with the locations 20, or the types of locations 20 depicted on the map 34.

As a fourth example of this third aspect, various techniques may be utilized to filter the locations 20 presented on the map 34. For example, respective messages 16 may have at least one message property, such as a message type (e.g., a brief text message such as a status posted in a social network, a narrative message such as an anecdote or document, an audio recording captured at a location 20, or a photo or video recording that depicts the location 20). The request 102 received from the user 12 may specify at least one selected message property, and the map 34 may be generated from the messages 16 having the at least one selected message property (e.g., only depicting locations 20 depicted in photo messages 16).

As a fifth example of this third aspect, an embodiment of these techniques may be configured to update the map 34 with information received after initially generating the map 34. For example, while presenting a map 34 to a user 12, an embodiment may receive from an individual store 18 a new message having a location 20, and may update the map with the new message. This variation may be advantageous, e.g., where a user 12 is referring to the map 34 for up-to-date information about the individuals 14, such as the current locations of the individuals 14 in an area 24. Those of ordinary skill in the art may devise many ways of presenting the map 34 while implementing the techniques presented herein.

A fourth aspect that may vary among embodiments of these techniques relates to additional features that may be implemented in such techniques. As a first example, the map 34 may also present the messages 16 associated with respective locations 20 to the user 12; e.g., upon receiving from the user 12 a selection of a location 20, an embodiment of these techniques may present the messages 16 associated with the selected location 20. Alternatively or additionally, an embodiment may be configured to, upon receiving a reply from a user 12 to a message 16 associated with a location 20 presented on the map 34, send the reply to an individual store 18 (including the individual store 18 from which the message 16 referenced by the reply was received).

As a second example of this fourth aspect, the presentation of a map 34 restricted to a vicinity of a user location of a user 12 may include offers associated with businesses located in the vicinity of the user location. For example, an embodiment of these techniques may receive a set of offers from respective businesses having a location (e.g., opportunistic discounts on goods or services), and if the user 12 views a map 34 of an area 24 including the location 20 of a business, the associated offers may be presented on the map 34.

As a third example of this fourth aspect, the device 94 configured to present maps 34 according to these techniques may also have one or more capabilities. For example, the device 94 may comprise a mobile phone presenting a voice capability, a mobile texting device with a software or hardware keyboard presenting a texting capability, or a camera presenting an image sending capability. Accordingly, the embodiment of these techniques may be configured to, while presenting messages 16 associated with locations 20 presented on the map 34, identify one or more message options that are associated with respective messages 16, and may present the message options in relation to the messages 16 on the map 34. For example, if a user 12 operating a text-capable device 94 selects a location 20 identified in a text message from an individual 14, the map 34 may include a message option to send a text message to the individual 14. In this manner, the embodiment of these techniques may utilize the capabilities of the device in the presentation of the map 34 of the locations 20.

Figure 7:
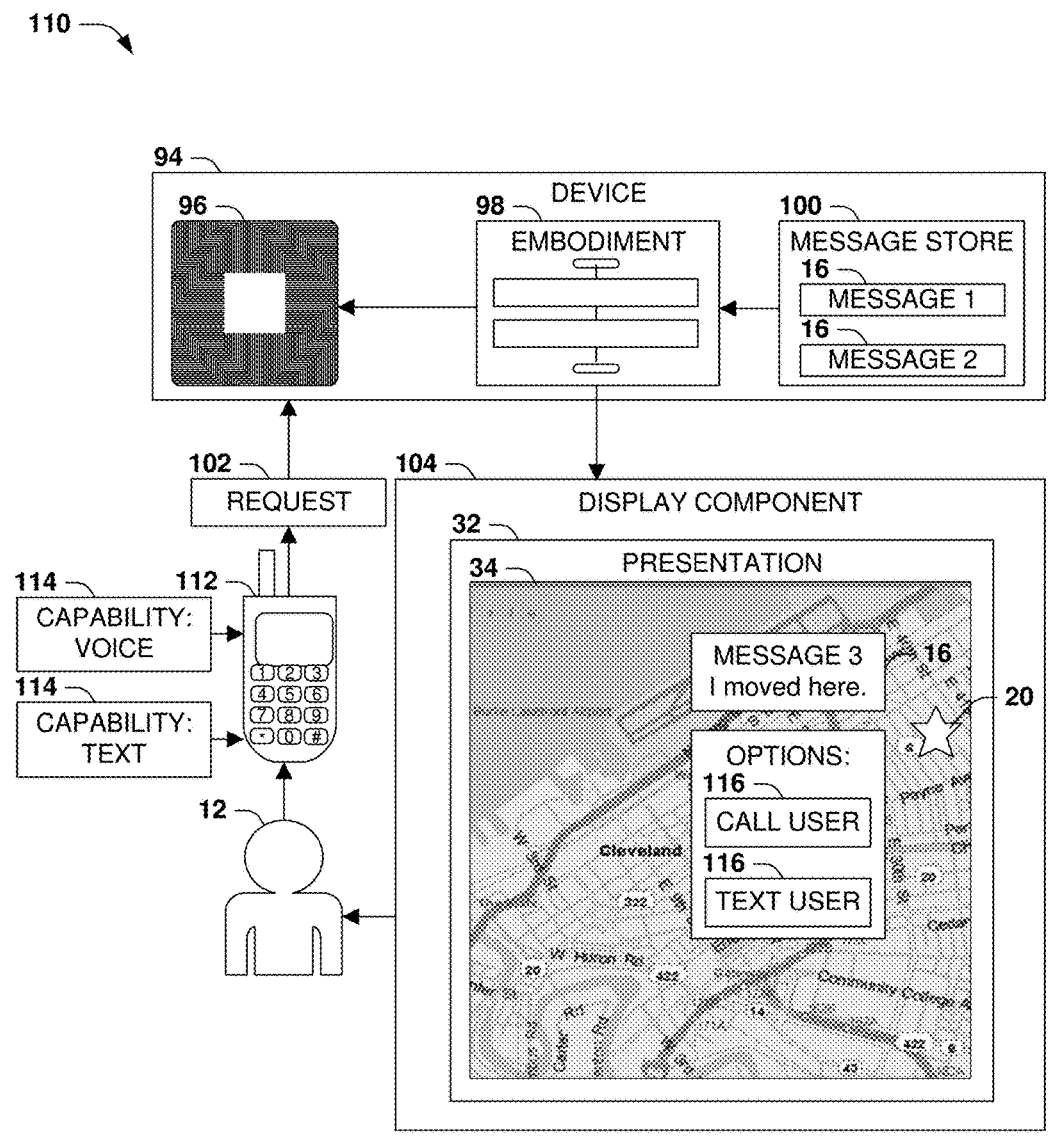
FIG. 7 is an illustration of an exemplary scenario featuring a user issuing a request for a presentation of a map of locations identified in messages written by one or more individuals and received from one or more individual stores.

FIG. 7 presents an illustration of an exemplary scenario 110 featuring a user 12 issuing a request 102 for a presentation of a map 34 of locations 20 identified in messages 16 written by one or more individuals 14 and received from one or more individual stores 18. The user 12 may issue the request 102 from a second device 112 having a set of capabilities 114 (e.g., a voice capability 114 indicating that the second device 112 may initiate and receive voice communication, and a text capability 114 indicating that the second device 112 may send and receive text messages). Accordingly, an embodiment 98 of these techniques may, while generating the map 34 of the locations 20 and one or more messages 16 associated with such locations 20, include one or more message options 116 associated with the message 16, such as the option of initiating a voice communication with the individual 14 who wrote the message 16, or sending a text message in reply to the message 16. In this manner, the embodiment 98 may utilize the capabilities 114 of the second device 112 while presenting the map 34 to the user 12. Those of ordinary skill in the art may devise many such additional features that may be included with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
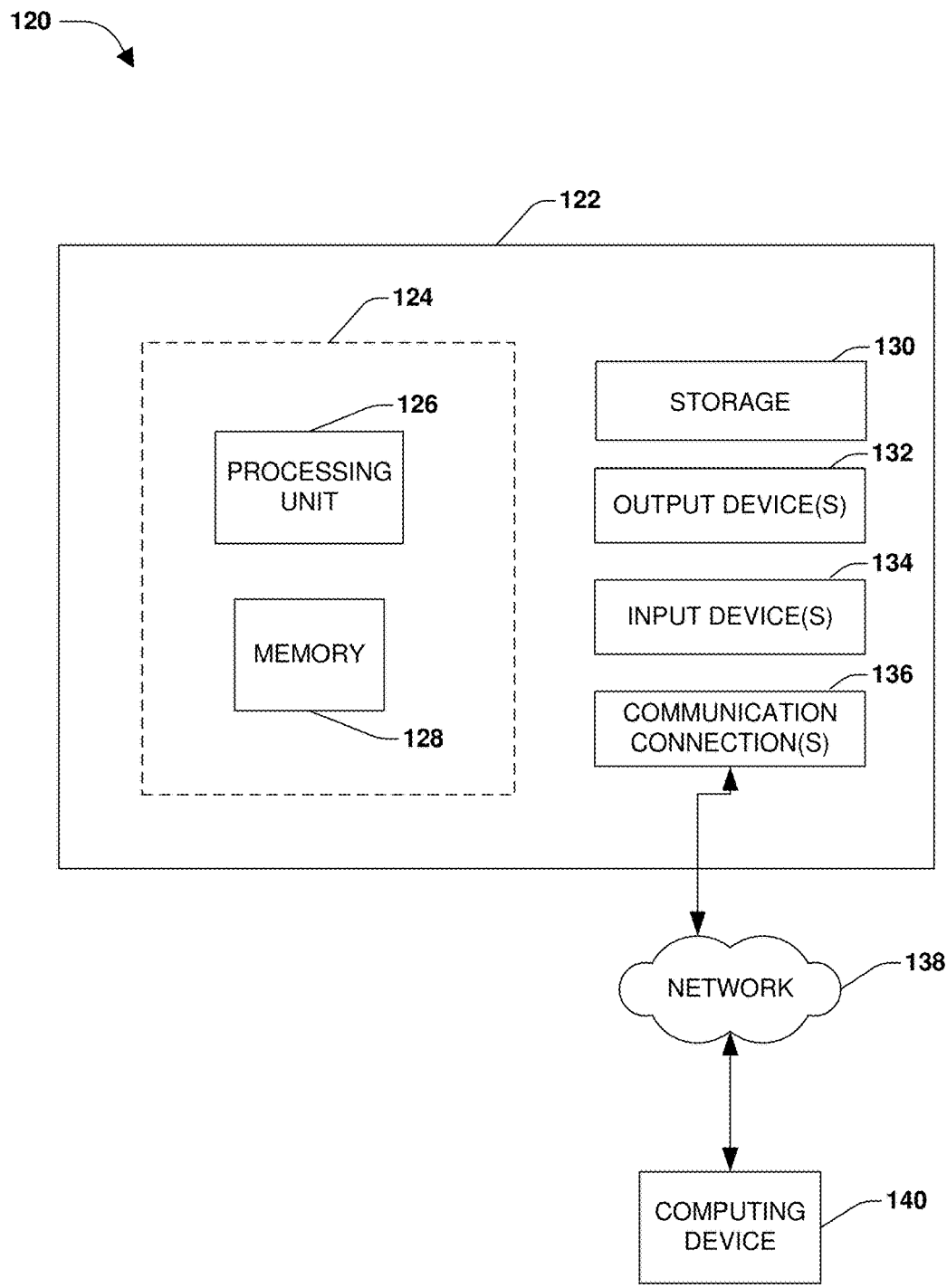
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 120 comprising a computing device 122 configured to implement one or more embodiments provided herein. In one configuration, computing device 122 includes at least one processing unit 126 and memory 128. Depending on the exact configuration and type of computing device, memory 128 may be volatile (such as RAM, for example), non-volatile (such as ROM, flash memory, etc., for example) or some combination of the two. This configuration is illustrated in FIG. 8 by dashed line 124.

In other embodiments, device 122 may include additional features and/or functionality. For example, device 122 may also include additional storage (e.g., removable and/or non-removable) including, but not limited to, magnetic storage, optical storage, and the like. Such additional storage is illustrated in FIG. 8 by storage 130. In one embodiment, computer readable instructions to implement one or more embodiments provided herein may be in storage 130. Storage 130 may also store other computer readable instructions to implement an operating system, an application program, and the like. Computer readable instructions may be loaded in memory 128 for execution by processing unit 126, for example.

The term "computer readable media" as used herein includes computer storage media. Computer storage media includes volatile and nonvolatile, removable and non-removable media implemented in any method or technology for storage of information such as computer readable instructions or other data. Memory 128 and storage 130 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 122. Any such computer storage media may be part of device 122.

Device 122 may also include communication connection(s) 136 that allows device 122 to communicate with other devices. Communication connection(s) 136 may include, but is not limited to, a modem, a Network Interface Card (NIC), an integrated network interface, a radio frequency transmitter/receiver, an infrared port, a USB connection, or other interfaces for connecting computing device 122 to other computing devices. Communication connection(s) 136 may include a wired connection or a wireless connection. Communication connection(s) 136 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 122 may include input device(s) 134 such as keyboard, mouse, pen, voice input device, touch input device, infrared cameras, video input devices, and/or any other input device. Output device(s) 132 such as one or more displays, speakers, printers, and/or any other output device may also be included in device 122. Input device(s) 134 and output device(s) 132 may be connected to device 122 via a wired connection, wireless connection, or any combination thereof. In one embodiment, an input device or an output device from another computing device may be used as input device(s) 134 or output device(s) 132 for computing device 122.

Components of computing device 122 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 122 may be interconnected by a network. For example, memory 128 may be comprised of multiple physical memory units located in different physical locations interconnected by a network.

Those skilled in the art will realize that storage devices utilized to store computer readable instructions may be distributed across a network. For example, a computing device 140 accessible via network 138 may store computer readable instructions to implement one or more embodiments provided herein. Computing device 122 may access computing device 140 and download a part or all of the computer readable instructions for execution. Alternatively, computing device 122 may download pieces of the computer readable instructions, as needed, or some instructions may be executed at computing device 122 and some at computing device 140.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-readable storage device comprising instructions that, when executed on a processor of a device having a message store and operated by a user having a user location, cause the device to present messages having a least one message property, the messages associated with locations and written by individuals represented in at least two individual stores respectively comprising an individual store interface configured to send messages to a user, respective individual stores associated with a visual identifier distinguishing the individual store from other individual stores, by:

upon receiving at least one credential authenticating the user, storing the at least one credential;

from respective individual stores:

requesting messages from at least one individual store at a message query frequency for presenting to the user;

authenticating the user with the individual store according to at least one credential; and requesting from the individual store the messages accessible to the user and having a location that is within a range of the user location by invoking the individual store interface to request the messages at a location message query frequency that is higher than the message query frequency;

receiving at least one offer having a location from at least one business;

upon receiving from an individual store a message associated with a location and written by at least one individual:

storing the message with the first time point in the message store, and identify, for respective locations, a message count of messages associated with the location; and upon receiving from the user through a device having at least one capability, at a second time point after the first time point, a request to present the messages and specifying a selected time point and at least one selected message property:

retrieving from the message store the messages having a time point within a range of the selected time point and having the at least one selected message property;

identify at least one message option associated with messages and the at least one capability of the device;

generating a map localized within a range of the user location and indicating the locations associated with the messages and, for respective messages, the at least one message option;

identifying on the map:
the locations having a message count of messages associated with the location that is higher than the message count of messages associated with other locations, and
the offers having locations that are within a range of the user location;

presenting the map to the user;

upon receiving from an individual store a new message having a location while presenting the map to the user, update the map with the new message;

upon receiving a reply from the user referencing a message from an individual, send the reply to the individual store from which the message referenced by the reply was received.

2. A method of presenting, on a device having a processor and operated by a user, locations associated with individuals, wherein the respective individuals are represented in an individual store, the method comprising:

receiving from the individual store messages written by at least one of the individuals that indicate a presence, at some point in time, of at least one of the individuals at one or more locations, where the messages are received at a message query frequency;

presenting at least some of the messages indicating a presence, at some point in time, of the at least one individual at the one or more locations in a user interface to the device;

determining a location of the one or more locations that is frequently identified by the messages;

presenting the location of the one or more locations determined to be frequently identified by the messages on a map; and requesting from the individual store additional messages accessible to the user and associated with a location of the device at a location message query frequency that is higher than the message query frequency.

3. The method of claim 2, wherein the user has a user location, and further comprising requesting from the individual store messages having a location that is within a range of the user location.

4. The method of claim 2, further comprising identifying a message count of the messages indicating a presence, at some point in time, of at least one individual at the one or more locations.

5. The method of claim 4, wherein the location of the one or more locations determined to be frequently identified by the messages includes a location having a message count that is higher than the message count of at least some of the other one or more locations associated with the messages.

6. The method of claim 2, wherein presenting the location of the one or more locations determined to be frequently identified by the messages on the map comprises highlighting the location of the one or more locations determined to be frequently identified by the messages.

7. The method of claim 2, wherein presenting the location of the one or more locations determined to be frequently identified by the messages on the map comprises using a distinctive indicator to indicate the location of the one or more locations determined to be frequently identified by the messages.

8. The method of claim 2, wherein at some point in time includes a time in the past such that the messages indicate a presence of the at least one individual at the one or more locations at a past time.

9. The method of claim 2, wherein at some point in time includes a time in the future such that the messages indicate an intention to visit the one or more locations at a future time.

10. The method of claim 2, wherein at some point in time includes a present time such that the messages indicate a current presence of the at least one individual at the one or more locations.

11. The method of claim 2, further comprising presenting, on the map, at least one contact option for contacting at least one individual represented by the indicated location, where the contact option identifies an individual contact address for contacting the individual through a particular channel.

12. The method of claim 11, further comprising, in response to a selection of a contact option, initiating contact between a user of the system and the individual using the individual contact address for the individual through the particular contact channel identified by the selected contact option.

13. A system comprising:
computer-readable storage device; and
program instructions stored on the computer-readable storage device that, when executed by at least one processor, cause the at least one processor to at least:
receive, from an individual store, messages written by at least one individual that indicate a presence of the at least one individual at one or more locations, where the messages are received at a message query frequency;
display at least some of the messages indicating a presence, at some point in time, of the at least one individual at the one or more locations in a user interface to the system;
determine a location of the one or more locations that is frequently identified by the messages;
present the location of the one or more locations determined to be frequently identified by the messages on a map; and
request from the individual store additional messages accessible to a user of the system and associated with a location of the system at a location message query frequency that is higher than the message query frequency.

14. The system of claim 13, wherein the messages indicate a presence, at some point in time, of at least one individual at one or more locations.

15. The system of claim 13, wherein the location of the one or more locations determined to be frequently identified by the messages is the location identified by the messages more frequently than any of the other one or more locations associated with the messages.

16. The system of claim 13, wherein at some point in time includes a time in the past such that the messages indicate a presence of at least one individual at the one or more locations at a past time.

17. The system of claim 13, wherein at some point in time includes a time in the future such that the messages indicate an intention to visit the one or more locations at a future time.

18. The system of claim 13, wherein at some point in time includes a present time such that the messages indicate a current presence of at least one individual at the one or more locations.

19. The system of claim 13, further comprising, in response to a selection of the location indicated on the map, the program instructions, when executed by the at least one processor, further cause the at least one processor to present, on the map, at least one contact option for contacting at least one individual represented by the indicated location, where the contact option identifies an individual contact address for contacting the individual through a particular channel.

20. The system of claim 19, further comprising, in response to a selection of a contact option, the program instructions, when executed by the at least one processor, further cause the at least one processor to initiate contact between a user of the system and the individual using the individual contact address for the individual through the particular contact channel identified by the selected contact option.

* * * * *